United States Patent
Dhar et al.

(10) Patent No.: US 6,685,427 B1
(45) Date of Patent: Feb. 3, 2004

(54) BRUSH SEAL FOR A ROTARY MACHINE AND METHOD OF RETROFITTING

(75) Inventors: Vikas Bhushan Dhar, Bangalore (IN); Norman Arnold Turnquist, Sloansville, NY (US); Ramesha Guntanur Venkatesh, Bangalore (IN); Lokesh Agrawal, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/064,505

(22) Filed: Jul. 23, 2002

(51) Int. Cl.$^7$ .................................................. F01D 11/00
(52) U.S. Cl. ............................... 415/173.3; 415/174.2; 29/888.021
(58) Field of Search ............................ 415/174.2, 173.3; 277/355; 29/888.021

(56) References Cited

U.S. PATENT DOCUMENTS

| | | | |
|---|---|---|---|
| 5,201,530 A | | 4/1993 | Kelch et al. |
| 5,265,412 A | * | 11/1993 | Bagepalli et al. .............. 60/800 |
| 6,547,522 B2 | * | 4/2003 | Turnquist et al. ........ 415/173.3 |

* cited by examiner

Primary Examiner—Edward K. Look
Assistant Examiner—Kimya N McCoy
(74) Attorney, Agent, or Firm—William E. Powell, III; Patrick K. Patnode

(57) ABSTRACT

A seal is provided for controlling flow of a fluid in a fluid path in a rotary machine. The seal comprises a brush seal carrier having a front plate and a back plate disposed therein. A brush seal is disposed between the front plate and the back plate. In addition, a flexible member is disposed between the brush seal and the back plate for reducing stress in the brush seal.

22 Claims, 2 Drawing Sheets

BRUSH SEAL FOR A ROTARY MACHINE AND METHOD OF RETROFITTING

BACKGROUND OF INVENTION

The present invention relates generally to rotary machines, and more particularly to an actuated seal for a rotary machine such as a steam or gas turbine.

Rotary machines include, without limitation, turbines for steam plants and compressors and turbines for gas plants. A steam turbine has a steam path that typically includes, in serial-flow relationship, a steam inlet, a turbine, and a steam outlet. A gas turbine has a gas path that typically includes, in serial-flow relationship, an air inlet, a compressor, a combustor, a turbine, and a gas outlet (also know as an exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine thereby leading to increased fuel costs. Also, steam-path leakage in the turbine area of a steam turbine, between the rotor of the turbine and the circumferentially surrounding casing, will lower the efficiency of the steam turbine thereby leading to increased fuel costs.

It is known in the art of steam turbines to position, singly or in combination, variable clearance labyrinth-seal segments, singly or in combination with at least one brush seal, in a circumferential array between the rotor of the turbine and the circumferentially surrounding casing to minimize steam-path leakage. Springs hold the segments radially inward against surfaces of the casing that establish radial clearance between the seal and rotor but allow segments to move radially outward in the event of rotor contact. While brush seals, singly or in combination with labyrinth-seal segments, have proved to be quite reliable, their ability to seal is decreased as a result of bending stresses on the bristles typically created by a pressure drop across the brush seal. Such bending stresses cause the bristles to bend, typically at the downstream portion of the bristle pack, thereby increasing the leakage of fluid therethrough.

Accordingly, there is a need in the art for a rotary machine having good leakage control between stationary and rotating components.

SUMMARY OF INVENTION

One embodiment of the present invention comprises a seal for controlling flow of a fluid in a fluid path in a rotary machine. The seal comprises a brush seal carrier having a front plate and a back plate disposed therein. A brush seal is disposed between the front plate and the back plate. In addition, a flexible member is disposed between the brush seal and the back plate for reducing stress in the brush seal.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
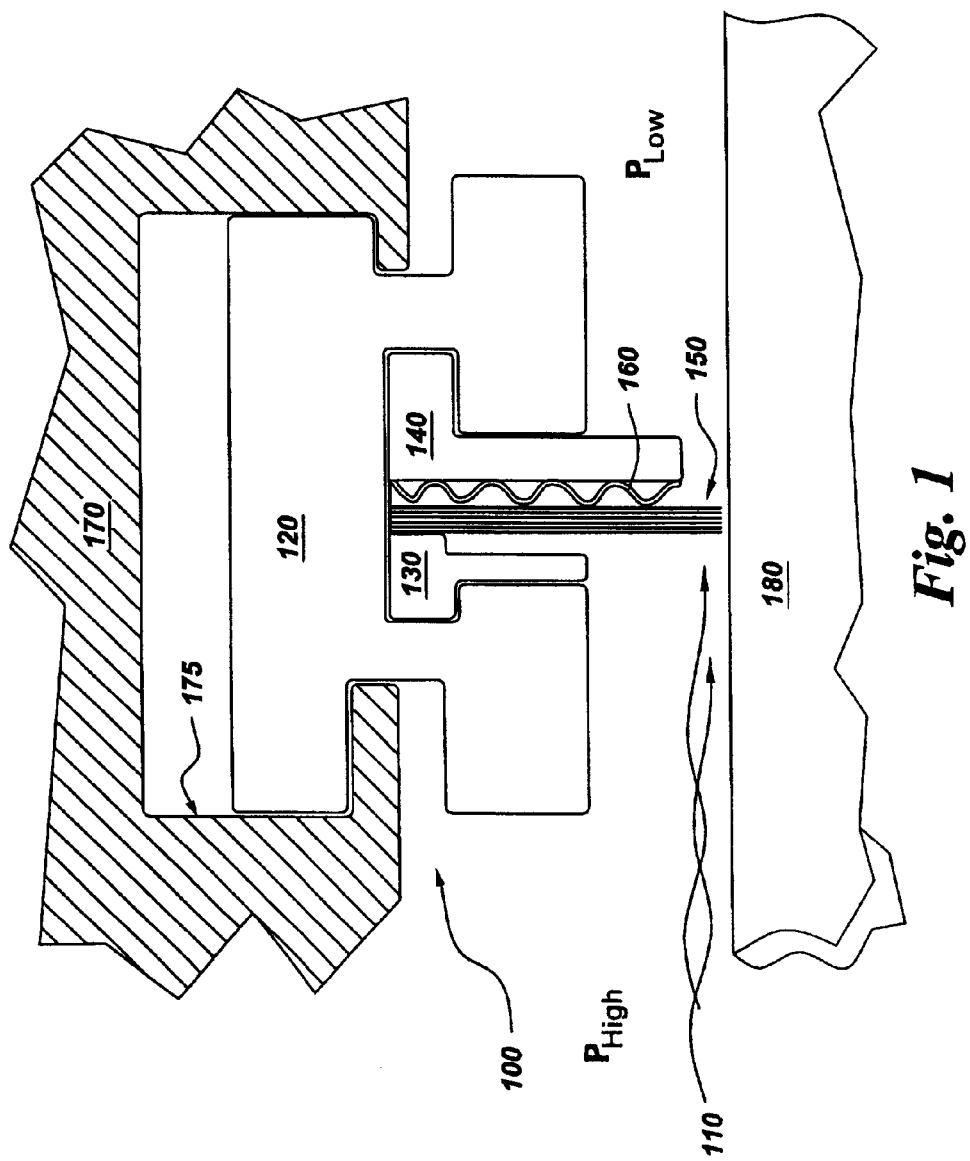
FIG. 1 is a schematic, cross sectional view of a seal in accordance with one embodiment of the present invention.
Figure 2:
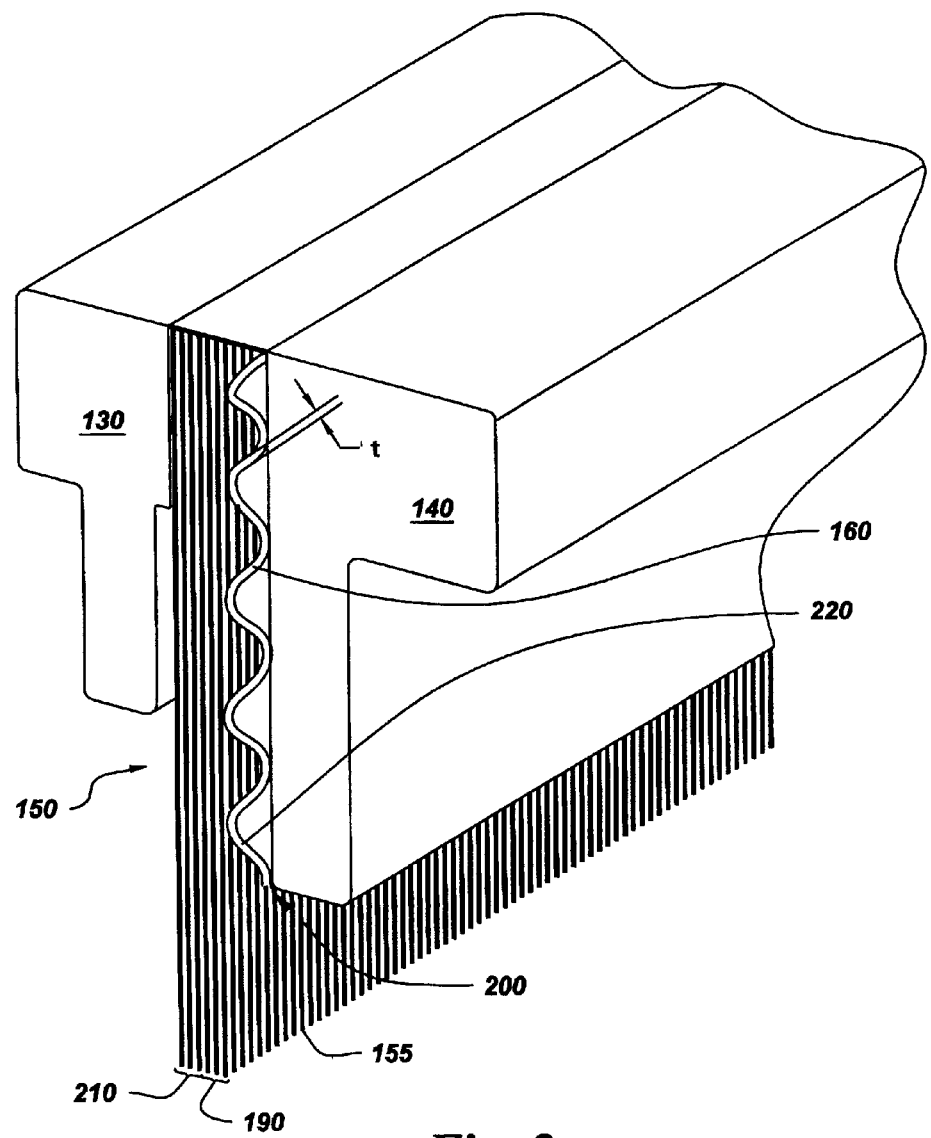
FIG. 2 is a perspective view of a brush seal and a flexible element of FIG. 1.

A seal 100 is provided for controlling flow of a fluid 110 in a fluid path in a rotary machine (see FIG. 1). The rotary machine is typically selected from the group consisting of electric generators, steam turbines, gas turbines and x-ray tubes. In one embodiment, the seal 100 typically comprises a (meaning at least one) brush seal carrier 120. The seal 100 comprises a (meaning at least one) front plate 130 and a (meaning at least one) back plate 140. A (meaning at least one) brush seal 150 is disposed between the front plate 130 and the back plate 140. In addition, a (meaning at least one) flexible member 160 is disposed between the brush seal 150 and the back plate 140. In operation, the flexible member 160 is adapted for reducing stress in the bristles of the seal 100. For purposes of describing the invention, it is understood that the terminology "seal carrier" includes, without limitation, a segment of a seal carrier that is manufactured in segments that are arrayed together to form a complete seal carrier. The seal carrier 100 is coupled to a casing 170 that is disposed circumferentially around a rotor 180. The casing 170 may, without limitation, be constructed as a single monolithic casing or as two or more longitudinally-attached casing segments. The rotor 180 may, without limitation, be constructed as a single monolithic rotor or as two or more longitudinally-attached rotor segments. The rotor 180 typically comprises a generally longitudinally-extending axis (not shown), and the casing 170 is generally coaxially aligned with the axis.

In the abovementioned embodiment, the flexible element 160 is disposed in the packing ring, or seal carrier, 120 for reducing stress in the seal 150. As used herein, the terms "in", "on", "thereon", "therein", "over", "above", "under" and the like are used to refer to the relative location of elements of the present invention as illustrated in the Figures and are not meant to be a limitation in any manner with respect to the orientation or operation of the present invention. In some operations, the stress comprises a bending stress caused by a pressure from the flow of the fluid 110 on the seal 150. The fluid 110 is disposed in a gap defined between the seal 150 and the rotor 180, wherein the fluid 110 has a pressure drop generally transverse to the gap, and wherein the pressure drop is generated during operation of the rotary machine. For illustrative purposes, it will be appreciated, however, that the fluid 110 in the fluid path flows from the high pressure side, designated "PHigh", towards the low pressure side, designated "PLow", i.e., from the left to right of drawing FIG. 1. In some operations, the pressure drop subjects each of the bristles 155 in the seal 150 to the abovementioned bending stress as well as creating a stress concentration area at a downstream seal portion 190 of the seal 150. As such, the flexible member 160 serves to reduce the stress created by the pressure drop when the rotary machine is in operation.

The flexible member 160 serves to reduce the bending stresses, for example, on the seal 150 caused by the fluid 110 pressure during operation of the rotary machine. Such reduction of bending stresses is typically accomplished by having the flexible member 160 bend in response to the pressure of the fluid 110 on the seal 150. As a result, stress concentration areas at the downstream seal portion 190, for example, are minimized due to the fact that the flexible member 160 absorbs a portion of the strain energy introduced in the seal 150 by the pressure created from the flow of fluid 110. It will be appreciated that the seal 150 comprises a plurality of bristles 155 and that the downstream seal portion 190 comprises a portion of the plurality of bristles 155 disposed downstream from the flow of fluid 100. In one embodiment, the thickness (designated "t") of flexible member 160 is typically in the range between about 0.002 in and about 0.020 in. In another embodiment, the thickness "t" of flexible member 160 is typically in the range between about 0.004 in and about 0.010 in. In a further embodiment, the flexible member 160 comprises a nickel-based alloy. Such nickel-based alloys are typically used in rotary machines having operating temperatures up to 1200° F. The nickel-based alloy typically comprises Ni, Cr, Mo, Fe, W, Co, Mn, V, Si, and C. In yet another embodiment, the flexible member 160 comprises stainless steel wherein the stainless steel is typically selected from the group consisting of 409 stainless steel, 410 stainless steel and 304 stainless steel. In some embodiments, the flexible member 160 is welded to the plate 140, brush seal 120 or both.

In some operations, the downstream seal portion 190 experiences a greater pressure than an upstream seal portion 210. If a bristle bending stress resulting from the pressure differential to be supported by the downstream seal portion 190 exceeds the yield strength of the bristles 155 making up the downstream seal portion 190, the bristles 155 tend to bend around a back plate corner 200. That is, the pressure drop across the brush seal 150 causes the bristles 155 to bend around the back plate corner 200 (also known as the radially inward tip of back plate 140) thereby causing bending stresses in the downstream seal portion 210 of the brush seal 150. As such, the sealing ability of the brush seal 150 is limited due to the stress concentration created at the point where the downstream seal portion 190 and the back plate corner 200 come into contact. The limitation of the sealing ability of the brush seal 150 is typically reduced by disposing the flexible member 160 between the seal 150 and the back plate 140. In one embodiment, the flexible member 160 comprises a contoured end portion 220 wherein the contoured end portion 220 is shaped to reduce the stress concentration created at the point where the downstream seal portion 190 and the back plate corner 200 come into contact. As used herein, the term "contoured" refers to the shape of the end portion 220 wherein the end portion 220 is arc-shaped so that when the fluid 110 is disposed adjacent the brush seal 150 and creates an axial force against the flexible member 160, the arc-shape of the end portion 220 allows the flexible member 160 to deform and slide radially between the seal 150 and the back plate 140.

In another embodiment, the flexible member 160 comprises a corrugated member. As used herein, the term "corrugated" refers to the material shape of the flexible member 160 such that the material is shaped to form a ridged or furrowed surface. The corrugated member is typically formed from sheet metal, for example, stainless steel sheet metal. It will be appreciated that the sheet metal may vary in thickness depending upon a desired application. In operation, the peaks and valleys of the corrugated member are disposed adjacent the seal 150 and the back plate 140. When the fluid 110 is introduced into the rotary machine, the peaks and valleys of corrugated member bend so as to cause the flexible member 160 to extend radially. As used herein, the term "extend" refers to the ability of the flexible member 160 to stretch out and expand to a partial or full length in the radial direction. The flexible member 160, by having a corrugated structure, is thereby able to absorb a portion of the strain energy introduced in the seal 150 by bending and extending when the pressure from the flow of the fluid 110 is disposed adjacent the seal 150. In this embodiment, the corrugated member comprises the contoured end portion 220 discussed herein.

A method of retrofitting the rotary machine is provided and comprises providing the brush seal carrier 120. This embodiment further comprises disposing the front plate 130 and the back plate 140 in the brush seal carrier 120 and disposing a brush seal 150 between the front plate 130 and the back plate 140. Furthermore, the method of retrofitting comprises disposing the flexible member 160 between the brush seal 150 and the back plate 140. In operation, the flexible member 160 serves to reduce stress in the brush seal 150 introduced by the pressure from the flow of the fluid 110. As discussed herein, the flexible member 160 reduces the bending stress on the seal 150 and the stress concentration area at the back plate corner 200 by absorbing a portion of the strain energy.

One aspect of such method of retrofitting the rotary machine is that the life of the brush seal 150 is extended by reducing the abovementioned stress areas through the use of flexible member 160. As such, wear and hysteresis effects on the brush seal 150 are minimized compared to conventional brush seals due to the strain energy absorption characteristics of flexible element 160. As used herein, the term "hysteresis" refers to the tendency of the brush seal bristles 155 to remain in a deflected position when the bristles 155 are exposed to the fluid 110, The life and performance of the brush seal bristles 155, singly or in combination with labyrinth-type seals, for example, is increased due to the fact that the bristles 155 do not continuously rub the back plate 140 and the frictional forces created by the hysteresis effect are decreased.

Another aspect to such method of retrofitting the rotary machine is that an existing seal 100 is simply removed and replaced with a replacement seal 100 having the flexible element 160 disposed therein. As such, down time of the rotary machine is reduced. A further aspect to such method of retrofitting is that flexible elements 160 of various shapes and sizes may be disposed in the seal carrier 120 so as to accommodate the pressures created by the flow of the fluid 110 on the brush seal 150. In other operations, such method of retrofitting allows a technician to replace the seal 100 without having to disassemble any major parts of the rotary machinery thereby reducing repair costs.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A seal for controlling flow of a fluid in a fluid path in a rotary machine comprising:
   a brush seal carrier comprising a front plate and a back plate disposed therein;
   a brush seal disposed between said front plate and said back plate; and
   a flexible member disposed between said brush seal and said back plate for reducing stress in said brush seal.

2. The seal of claim 1 wherein said rotary machine is selected from the group consisting of electric generators, steam turbines, gas turbines and x-ray tubes.

3. The seal of claim 1 wherein said brush seal comprises a plurality of bristles.

4. The seal of claim 1 wherein said flexible member comprises a corrugated member.

5. The seal of claim 1 wherein said flexible member comprises a nickel-based alloy.

6. The seal of claim 1 wherein said nickel-based alloy comprises Ni, Cr, Mo, Fe, W, Co, Mn, V, Si, and C.

7. The seal of claim 1 wherein said flexible member comprises stainless steel.

8. The seal of claim 1 wherein said stainless steel is selected from the group consisting of 409 stainless steel, 410 stainless steel and 304 stainless steel.

9. The seal of claim 1 wherein a thickness of said flexible member is in the range between about 0.002 in and about 0.020 in.

10. The seal of claim 1 wherein a thickness of said flexible member is in the range between about 0.004 in and about 0.010 in.

11. The turbine of claim 1 wherein said brush seal comprises a plurality of bristles.

12. The turbine of claim 1 wherein said nickel-based alloy comprises Ni, Cr, Mo, Fe, W, Co, Mn, V, Si, and C.

13. A turbine comprising:
   a rotor comprising a generally longitudinally extending axis;
   a casing generally coaxially aligned with said axis, said casing circumferentially surrounding and radially spaced from said rotor, said casing comprising an inner circumferential channel generally coaxially aligned with said rotor;
   a brush seal carrier disposed within said casing, said brush seal carrier comprising at least one front plate and at least one back plate;
   a brush seal disposed between said front plate and said back plate; and
   a flexible member disposed between said back plate and said brush seal, said flexible member disposed to reduce stress in said brush seal.

14. The turbine of claim 13 wherein said flexible member comprises a corrugated member.

15. The turbine of claim 13 wherein said flexible member comprises a nickel-based alloy.

16. The turbine of claim 13 wherein said flexible member comprises stainless steel.

17. The turbine of claim 16 wherein said stainless steel is selected from the group consisting of 409 stainless steel, 410 stainless steel and 304 stainless steel.

18. The turbine of claim 13 wherein a thickness of said flexible member is in the range between about 0.002 in and about 0.020 in.

19. The turbine of claim 13 wherein a thickness of said flexible member is in the range between about 0.004 in and about 0.010 in.

20. A method of retrofitting a rotary machine comprising:
   providing a brush seal carrier;
   disposing a front plate and a back plate in said brush seal carrier;
   disposing a brush seal between said front plate and said back plate; and
   disposing a flexible member between said brush seal and said back plate for reducing stress in said brush seal.

21. The method of claim 20 wherein the step of disposing a flexible member between said brush seal and said back plate for reducing stress in said brush seal comprises disposing a corrugated member that absorbs said stress from said brush seal when said brush seal is exposed to a fluid flow.

22. The method of claim 20 wherein said flexible member comprises a corrugated member that flexes upon introduction of a fluid flow in said rotary machine so as to reduce stressing said brush seal.

* * * * *

UNITED STATES PATENT AND TRADEMARK OFFICE
CERTIFICATE OF CORRECTION

PATENT NO. : 6,685,427 B1
DATED : February 3, 2004
INVENTOR(S) : Vikas B. Dhar et al.

It is certified that error appears in the above-identified patent and that said Letters Patent is hereby corrected as shown below:

Column 4,
Line 60, insert -- and contacting said brush seal -- after "plate".

Column 5,
Line 16, change the claim number "11" to number -- 12 -- and the dependency from claim "1" to claim -- 11--.
Line 18, change the claim number "12" to number -- 15 -- and the dependency from claim "1" to claim -- 14--.
Line 20, change the claim number "13" to number -- 11 --.
Line 35, after "seal" insert -- and contacting said brush seal --.

Column 6,
Line 1, change the claim number "14" to number -- 13 -- and the dependency from claim "13" to claim -- 11--.
Line 3, change the claim number "15" to number -- 14 -- and the dependency from claim "13" to claim -- 11--.
Lines 5, 10 and 13, change the dependency to claim 11.
Line 24, after "plate" insert -- and contacting said brush seal --.

Signed and Sealed this

Sixth Day of July, 2004

JON W. DUDAS
*Acting Director of the United States Patent and Trademark Office*